(12) United States Patent
Tsai

(10) Patent No.: US 7,226,200 B2
(45) Date of Patent: Jun. 5, 2007

(54) LIGHT GUIDING DEVICE WITH TWO OPPOSITE LIGHT EMITTING SURFACES AND BACKLIGHT MODULE USING THE SAME

(75) Inventor: Kun-Jung Tsai, Tu-Cheng (TW)

(73) Assignee: Hon Hai Precision Industry Co. Ltd., Tu-Cheng, Taipei Hsien (TW)

( * ) Notice: Subject to any disclaimer, the term of this patent is extended or adjusted under 35 U.S.C. 154(b) by 22 days.

(21) Appl. No.: 10/951,847

(22) Filed: Sep. 27, 2004

(65) Prior Publication Data
US 2005/0088838 A1   Apr. 28, 2005

(30) Foreign Application Priority Data
Oct. 24, 2003   (TW) .............................. 92129553 A

(51) Int. Cl.
*F21V 7/04* (2006.01)
(52) U.S. Cl. ...................... 362/616; 362/607; 362/628; 362/629
(58) Field of Classification Search ................ 362/616, 362/603, 609, 623–625, 628, 615, 308, 607, 362/629
See application file for complete search history.

(56) References Cited

U.S. PATENT DOCUMENTS

| | | | | |
|---|---|---|---|---|
| 5,280,415 | A * | 1/1994 | Barnette ...................... | 362/604 |
| 5,550,715 | A * | 8/1996 | Hawkins ...................... | 362/630 |
| 5,816,677 | A * | 10/1998 | Kurematsu et al. ......... | 362/609 |
| 5,856,819 | A * | 1/1999 | Vossler ........................ | 345/102 |
| 5,963,280 | A * | 10/1999 | Okuda et al. ................ | 349/65 |
| 6,132,048 | A * | 10/2000 | Gao et al. .................... | 353/20 |
| 6,234,639 | B1 * | 5/2001 | Noguchi ...................... | 362/600 |
| 6,250,767 | B1 | 6/2001 | Kusafuka et al. | |
| 6,334,689 | B1 * | 1/2002 | Taniguchi et al. .......... | 362/619 |
| 6,513,942 | B2 * | 2/2003 | Ludwig et al. .............. | 362/615 |
| 6,612,710 | B2 | 9/2003 | Suzuki et al. | |
| 6,612,723 | B2 * | 9/2003 | Futhey et al. ............... | 362/339 |
| 6,795,136 | B2 * | 9/2004 | Umemoto et al. ........... | 349/61 |

(Continued)

FOREIGN PATENT DOCUMENTS

TW       552439       9/2003

OTHER PUBLICATIONS

Merriam-Webster's Collegiate Dictionary, 10th Edition, 1998, p. 1125.*

*Primary Examiner*—John Anthony Ward
*Assistant Examiner*—David Makiya
(74) *Attorney, Agent, or Firm*—Jeffrey T. Knapp

(57) ABSTRACT

A backlight module (1) has a light guiding device (2) and a light source (200). The light guiding device has a single light guide plate (20), and a reflection member (26). The single light guide plate has a light incidence surface (211), a top light emitting surface (23), and an opposite bottom light emitting surface (22). The single light guide plate further has a plate cavity (not labeled) formed therein for receiving the reflection member. The reflection member has a top reflection surface (28) and an opposite bottom reflection surface (29). The top reflection surface of the reflection member faces toward the top light emitting surface of the light guide plate, and the bottom reflection surface of the reflection member faces toward the bottom light emitting surface of the light guide plate.

10 Claims, 5 Drawing Sheets

U.S. PATENT DOCUMENTS

| | | | |
|---|---|---|---|
| 6,871,975 B2 * | 3/2005 | Chuang .......................... 362/27 |
| 6,896,386 B2 * | 5/2005 | Kitazawa et al. ............ 362/616 |
| 6,926,420 B2 * | 8/2005 | Sung ........................... 362/629 |
| 6,995,898 B2 * | 2/2006 | Otake et al. ................. 359/318 |
| 7,165,865 B2 * | 1/2007 | Cho ............................ 362/253 |
| 2003/0063456 A1 * | 4/2003 | Katahira ....................... 362/27 |
| 2004/0095740 A1 * | 5/2004 | Mai et al. ...................... 362/27 |

* cited by examiner

LIGHT GUIDING DEVICE WITH TWO OPPOSITE LIGHT EMITTING SURFACES AND BACKLIGHT MODULE USING THE SAME

BACKGROUND OF THE INVENTION

1. Field of the Invention

The present invention relates to a light guiding device and a backlight module employing the light guiding device, the backlight module typically being part of an LCD (liquid crystal display).

2. Description of Prior Art

Because an LCD device has the merits of being thin, light in weight, and drivable by a low voltage, it is extensively employed in various electronic devices.

In an LCD device, usually a backlight module having a light source and a light guiding device is used to provide the needed illumination. The light source emits light beams to the light guiding device, which then transmits the light beams to illuminate liquid crystal molecules in a liquid crystal panel. It is important that the light guiding device transmits light beams to the liquid crystal panel uniformly.

Referring to FIG. 6, an exploded, isometric view of a typical backlight module 8 is shown. The backlight module 8 comprises a light guiding plate 81, a reflection member 82, a diffusing plate 83, a converging plate 84, a light source 85, and a light source cover 86. The light guide plate 81 has a light incidence surface 811, a bottom surface 812, and a light emitting surface 813. The reflection member 82, the light guiding plate 81, the diffusing plate 83 and the converging plate 84 are stacked one upon the other in that order. The light source 85 and the light source cover 86 are disposed adjacent to the light incidence surface 811.

The light source cover 86 functions mainly as a reflection element, to ensure that most if not all of the light beams emitted from the light source 85 enter the light guide plate 81 through the light incident surface 811. The light beams are transmitted in the light guide plate 81 and reflected by the reflection member 82, and emit from the light emitting surface 813. The diffusing plate 83 diffuses the light beams so that they are more uniformly distributed. The converging plate 84 then converges the light beams to illuminate a liquid crystal panel (not shown).

Referring to FIG. 7 and FIG. 8, these are isometric views of a mobile phone 9, respectively is showing an external display 92 when the mobile phone 9 is in a folded state, and an internal display 91 when the mobile phone 9 is in an unfolded state. The backlight module 8 is not suitable for this kind of two-screen display device. Even if the reflection member 82 were removed, the backlight module 8 would not be able to provide uniform illumination at both sides thereof. If two backlight modules 8 were to be employed, the whole mobile phone 9 would be unduly thick and heavy.

It is desired to provide a new light guiding device and a corresponding backlight module which overcome the above-described problems.

SUMMARY OF THE INVENTION

It is an object of the present invention to provide a light guiding device which yields uniform illumination at two opposite sides thereof, and a backlight module incorporating such a light guiding device.

A light guiding device of the present invention comprises: a single light guide plate comprising a light incidence surface, a top light emitting surface, and an opposite bottom tight emitting surface; and a reflection member comprising a top reflection surface and an opposite bottom reflection surface. The single light guide plate has a plate cavity formed therein for receiving the reflection member. The top reflection surface of the reflection member faces toward the top light emitting surface of the light guide plate. The bottom reflection surface of the reflection member faces toward the bottom light emitting surface of the light guide plate. When light beams enter the light guide plate via the light incidence surface, some of the light beams are reflected by the top reflection surface of the reflection member and emit from the top light emitting surface of the light guide plate; and similarly other of the light beams are reflected by the bottom reflection surface of the reflection member and emit from the bottom light emitting surface of the light guide plate.

A backlight module of the present invention comprises the above-described light guiding device, and a light source disposed adjacent to the light incidence surface of the light guide plate.

Other objects, advantages, and novel features of the present invention will become more apparent from the following detailed description when taken in conjunction with the accompanying drawings.

DETAILED DESCRIPTION OF THE PRESENT INVENTION

Figure 1:
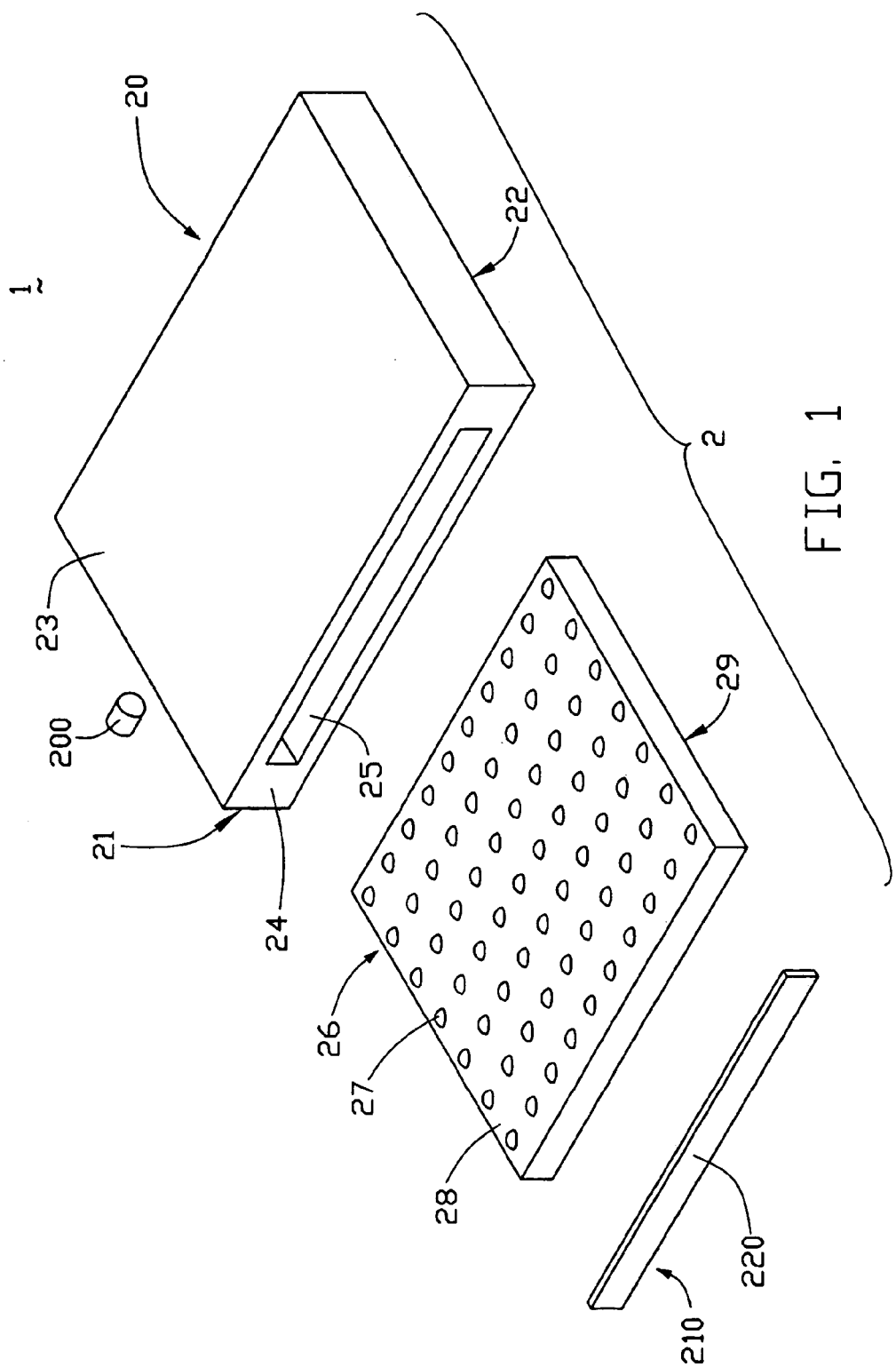
FIG. 1 is an exploded, isometric view of a backlight module according to a first embodiment of the present invention.
Figure 2:
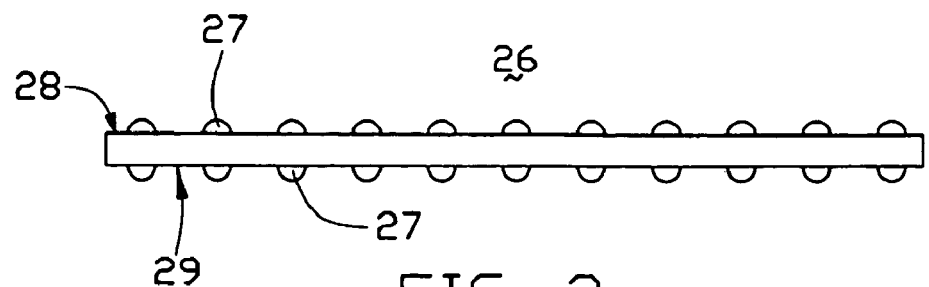
FIG. 2 is a side plan view of a reflection member of the backlight module of FIG. 1.

Referring to FIG. 1 and FIG. 2, a backlight module 1 according to the first embodiment of the present invention is shown. The backlight module 1 includes a light guiding device 2, and a light source 200. The light guiding device 2 comprises a light guide plate 20, a reflection member 26 and a reflection plate 210. The light guide plate 20 is made of a transparent material such as glass or acrylic. The light guide plate 20 has a rectangular profile, and comprises a light incidence surface 21 facing the light sources 200, two opposite light emitting surfaces 22, 23, and a side surface 24. The light guide plate 20 further comprises an inner plate cavity (not labeled) that has an opening 25 at the side surface 24, the inner plate cavity being used to accommodate the reflection member 26. When the reflection member 26 is put into the inner plate cavity, the reflection plate 210 is attached to the side surface 24 in order to prevent the reflection member 26 from sliding out. A reflection film 220 is attached to the reflection plate 210, in order to avoid leakage of light at the side surface 24. The reflection member 26 has a rectangular profile, and includes a top reflection surface 28 and a bottom reflection surface 29. Each of the top and bottom reflection surfaces 28, 29 has a diffusing region of the same size, the diffusing region having a plurality of micro dots 27. The light source 200 is preferably a light-emitting diode (LED).

In assembly, the reflection member 26 is received in the inner plate cavity such that the top reflection surface 28 and the bottom reflection surface 29 face the light emitting surfaces 23, 22, respectively.

Figure 3:
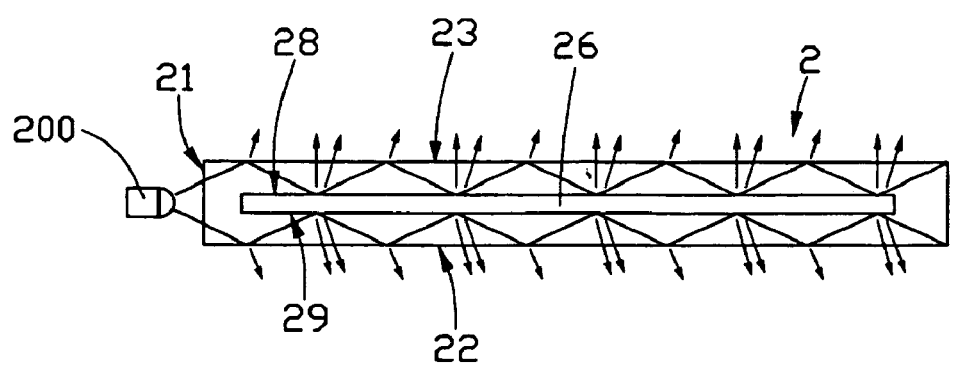
FIG. 3 s a side plan view of the backlight module of FIG. 1, showing essential optical paths thereof.

Referring to FIG. 3, optical paths of the backlight module 1 are shown. Light beams irradiated from light source 200 enter the light guiding device 2 through the light incidence surface 21. Some of the light beams are received by the top reflection surface 28 and emit from the light emitting surface 23, and some of the light beams are received by the bottom reflection surface 29 and emit from the light emitting surface 22. In these processes, the micro dots 27 (not shown in FIG. 3) diffuse received light beams, and so generate uniform emission of light beams from the light emitting surfaces 22, 23.

Figure 4:
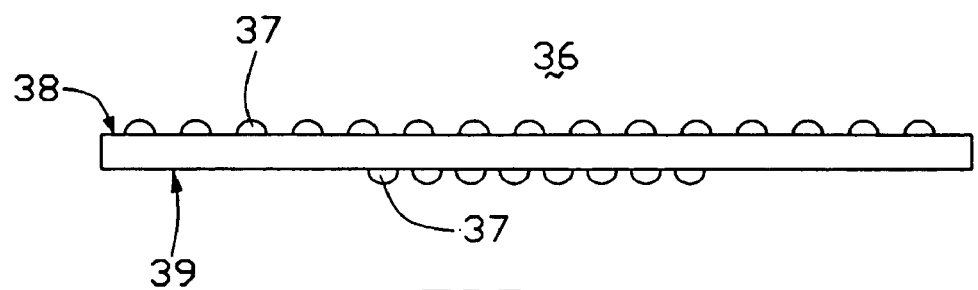
FIG. 4 is a side plan view of a reflection member of a backlight module according to a second embodiment of the present invention.
Figure 5:
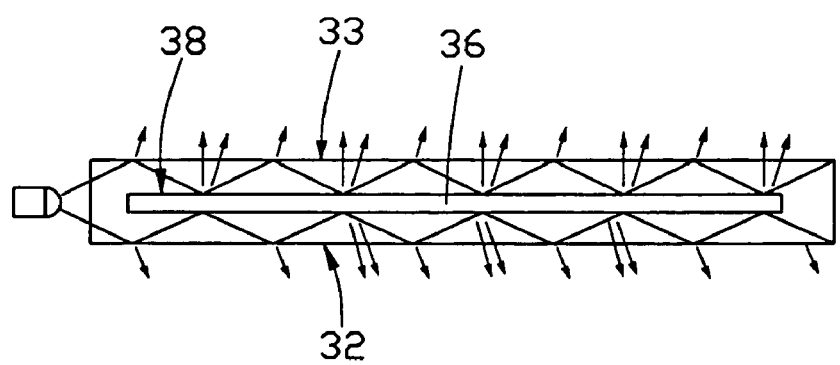
FIG. 5 is a side plan view of the backlight module according to the second embodiment of the present invention, showing essential optic paths thereof.
Figure 6:
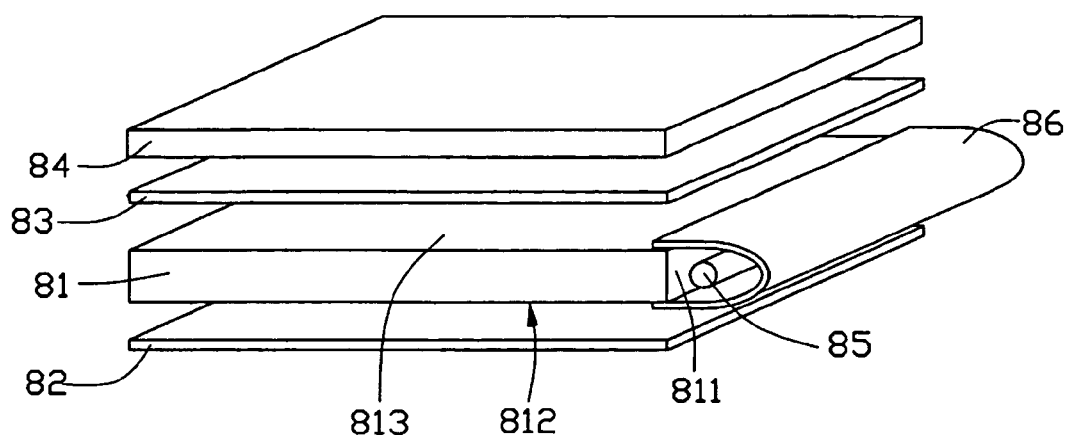
FIG. 6 is an exploded, isometric view of a conventional backlight module.
Figure 7:
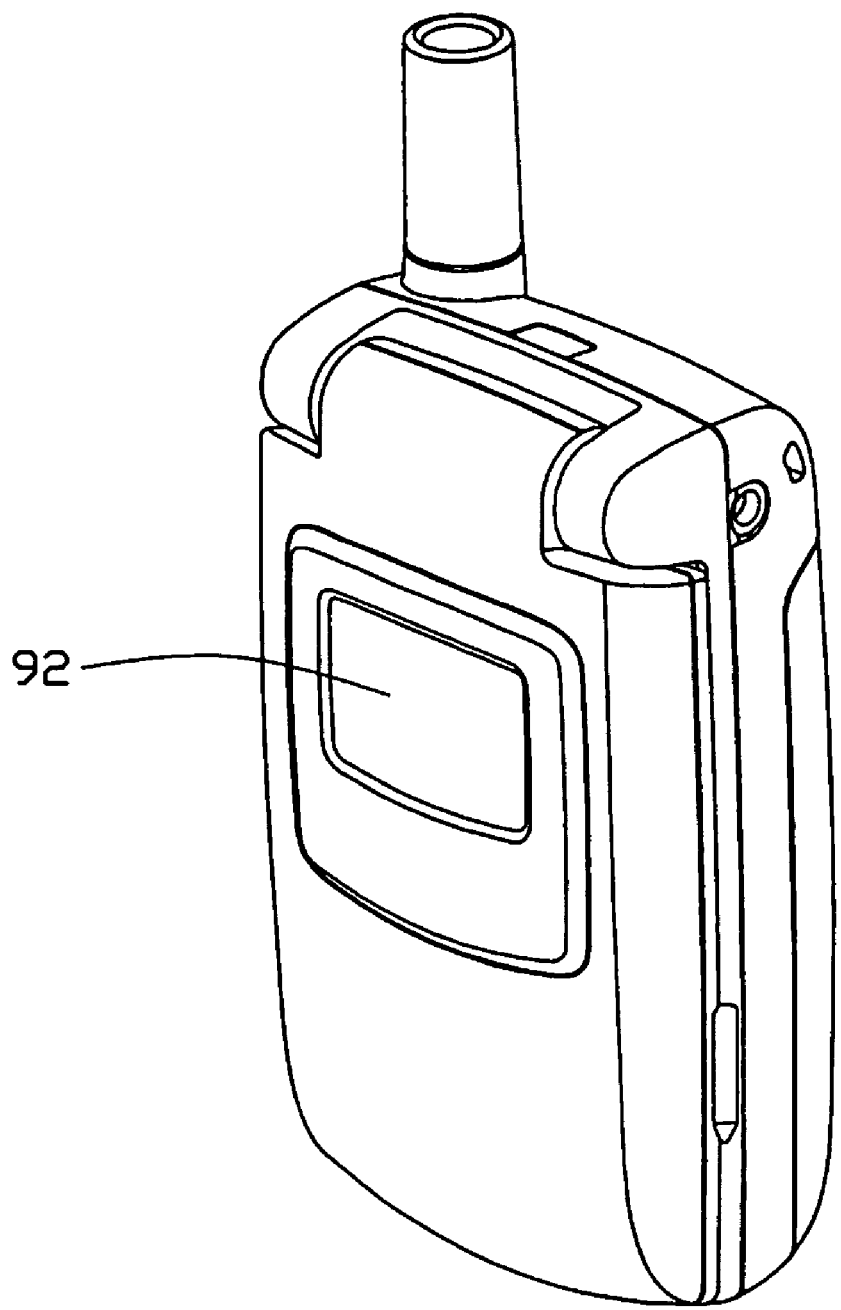
FIG. 7 is an isometric view of a double screen mobile phone in a folded state.
Figure 8:
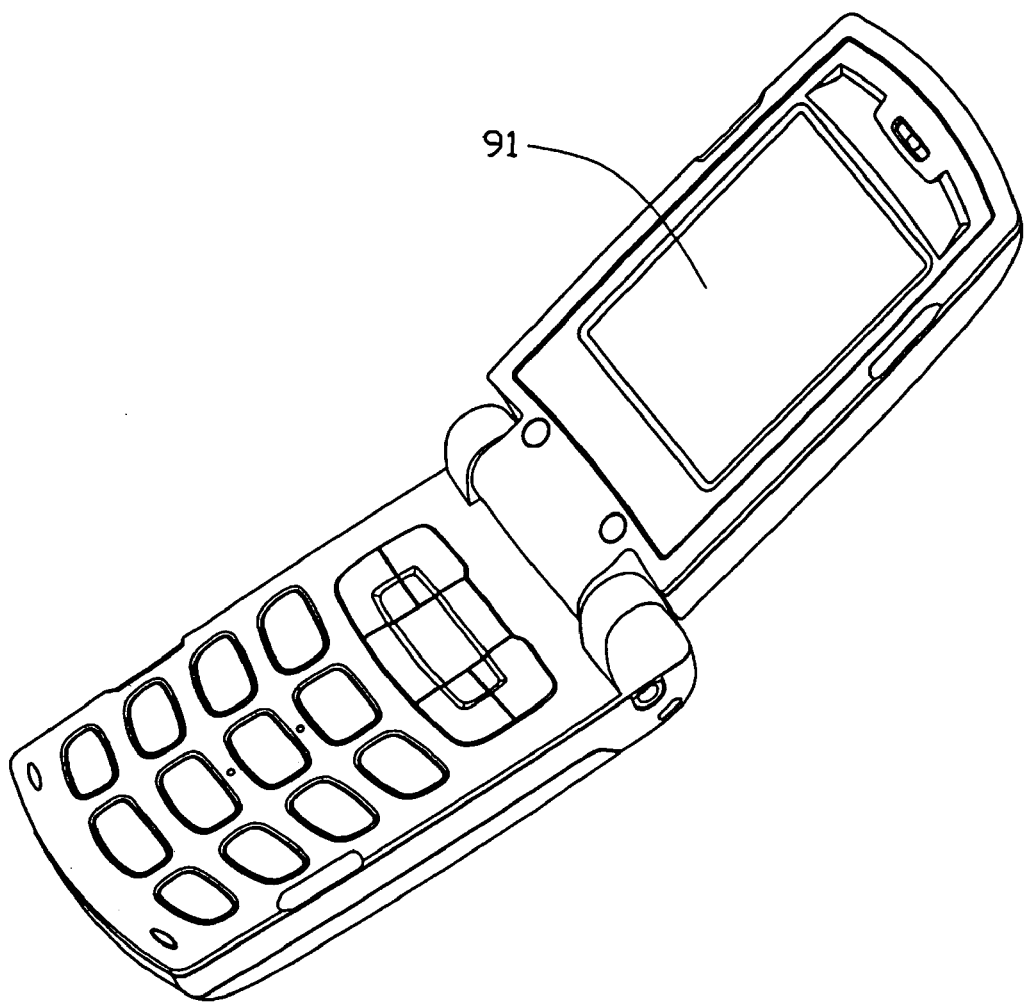
FIG. 8 is similar to FIG. 7, but showing the mobile phone in an unfolded state.

FIG. 4 and FIG. 5 respectively show side views of a reflection member 36 and a backlight module according to the second embodiment of the present invention, with essential optical paths of the backlight module also shown. A plurality of micro dots 37 is provided on a top reflection surface 38 and a bottom reflection surface 39 of the reflection member 36. The micro dots 37 are arranged in a uniform matrix formation on each of the top and bottom reflection surfaces 38, 39. The areas of the top and bottom reflection surfaces 38, 39 covered by the micro dots 37 are respectively defined as a top diffusing region and a bottom diffusing region. The area of the top diffusing region essentially covers the entire top reflection surface 38. However, the area of the bottom diffusing region covers only a central portion of the bottom reflection surface 39. In a typical application, the bottom diffusing area on the bottom reflection surface 39 corresponds to a size of an external display of a cover of a mobile phone. The top diffusing area on the top reflection surface 38 corresponds to a size of an internal display of the cover of the mobile phone.

In summary, in most mobile phones that have two display screens, the external display is smaller than the internal display. The backlight module 2 used in such a mobile phone does not waste light, because the bottom diffusing area corresponding to the external display is the same size as the size of the display.

The light guiding device 2 employs the light guide plate 20 having the light emitting surfaces 22, 23, and the reflection member 26 having the reflection surfaces 28, 29. The light guiding device 2 can therefore provide uniform illumination at two opposite sides. The reflection member 26 is accommodated in the inner plate cavity of the light guide plate 20, which makes the whole light guiding device 2 comparatively thin and light.

The reflection member 26 can be made by any of the following methods: 1) integrally forming a transparent body, and then attaching two reflection films on two opposite sides of the body respectively; 2) combining two thin reflection plates together; or 3) polishing two opposite sides of a silver or aluminum plate.

The inner plate cavity containing the reflection member 26 can be configured to position the reflection member 26 relative to the light emitting surfaces 22, 23. For example, the inner plate cavity can be configured to be nearer to one of the light emitting surfaces 23, 22 of the light guide plate 20, so that a suitable distribution of light beams reaches the respective light emitting surfaces 22, 23. The top and bottom diffusing areas of the reflection member 26 can have both their locations and sizes configured according to the particular needs of various double screen electronic devices in which the light guiding device 2 is employed.

In other embodiments, where brighter illumination is required, the light source 200 can be one or more CCFLs (Cold Cathode Fluorescent Lamps) instead of an LED. The light guide plate 20 can be wedge-shaped instead of having a rectangular profile. The reflection member 26 can be wedge-shaped instead of having a rectangular profile.

It is to be further understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guiding device, comprising:
   a single light guide plate comprising a light incident surface, a top light emitting surface, and an opposite bottom light emitting surface; and
   a reflection member comprising a top reflection surface and an opposite bottom reflection surface;
   wherein the single light guide plate has a plate cavity formed therein for receiving the reflection member, the top reflection surface of the reflection member faces toward the top light emitting surface of the light guide plate, and the bottom reflection surface of the reflection member faces toward the bottom light emitting surface of the light guide plate; and
   when light beams enter the light guide plate via the light incidence surface, some of the light beams are reflected by the top reflection surface of the reflection member and emit from the top light emitting surface of the light guide plate, and other of the light beams are reflected by the bottom reflection surface of the reflection member and emit from the bottom light emitting surface of the light guide plate.

2. The light guiding device as claimed in claim 1, wherein the light guide plate further comprises a side surface, the side surface has an opening defined therein and being configured for insertion of the reflection member into the plate cavity and a reflection plate is attached to the side surface.

3. The light guiding device as claimed in claim 2, further comprising a reflection film attached to the reflection plate.

4. The light guiding device as claimed in claim 1, wherein a plurality of micro dots is formed on the reflection surfaces, thereby defining a top diffusing region and a bottom diffusing region respectively.

5. The light guiding device as claimed in claim 4, wherein areas of the top diffusing region and the bottom diffusing region are different from each other.

6. A backlight module, comprising:
   a light guiding device comprising a single light guide plate and a reflection member; and
   a light source;
   wherein the single light guide plate comprises a light incident surface, a top light emitting surface, and an opposite bottom light emitting surface, the reflection member comprises a top reflection surface and an opposite bottom reflection surface, the single light guide plate further comprises an inner plate cavity formed therein for receiving the reflection member, and a side surface with an opening for putting the reflection member into the inner plate cavity, the top reflection surface of the reflection member faces toward the top light emitting surface of the light guide plate, the bottom reflection surface of the reflection member faces toward the bottom light emitting surface of the light guide plate, and the light source is disposed adjacent to the light incident surface of the light guide plate; and when light beams emitted from the light source enter the light guide plate via the light incidence surface, some of the light beams are reflected by the top reflection surface of the reflection member and emit from the top light emitting surface of the light guide plate, and other of the light beams are reflected by the bottom reflection surface of the reflection member and emit from the bottom light emitting surface of the light guide plate.

7. The backlight module as claimed in claim 6, further comprising a reflection plate attached to the side surface.

8. The backlight module as claimed in claim 7, further comprising a reflection film attached to the reflection plate.

9. The backlight module as claimed in claim 6, wherein a plurality of micro dots is formed on the reflection surfaces, thereby defining a top diffusing region and a bottom diffusing region respectively.

10. The backlight module as claimed in claim 6, wherein the light source is an LED (light-emitting diode) or a CCFL (Cold Cathode Fluorescent Lamp).

* * * * *